(12) United States Patent
Han et al.

(10) Patent No.: US 7,592,862 B2
(45) Date of Patent: *Sep. 22, 2009

(54) DIGITAL TEMPERATURE SENSING DEVICE USING TEMPERATURE DEPENDING CHARACTERISTIC OF CONTACT RESISTANCE

(75) Inventors: Hi-Hyun Han, Ichon-shi (KR); Jun-Gi Choi, Ichon-shi (KR)

(73) Assignee: Hynix Semiconductor, Inc., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/979,871

(22) Filed: Nov. 9, 2007

(65) Prior Publication Data
US 2008/0061868 A1 Mar. 13, 2008

Related U.S. Application Data

(63) Continuation of application No. 11/146,043, filed on Jun. 7, 2005, now Pat. No. 7,312,509.

(30) Foreign Application Priority Data
Dec. 28, 2004 (KR) .................. 10-2004-0113575

(51) Int. Cl.
*G05F 1/10* (2006.01)
(52) U.S. Cl. .................. 327/541; 327/538; 327/543
(58) Field of Classification Search ......... 327/538–543; 323/313, 315
See application file for complete search history.

(56) References Cited

U.S. PATENT DOCUMENTS

| | | | |
|---|---|---|---|
| 3,582,761 A | 6/1971 | Hall, Jr. | |
| 4,138,616 A | 2/1979 | Turner | |
| 4,169,243 A | 9/1979 | Payne et al. | |
| 4,205,327 A | 5/1980 | Dahlke | |

(Continued)

FOREIGN PATENT DOCUMENTS

KR 1998-015460 5/1998

(Continued)

OTHER PUBLICATIONS

Jia Songliang, Bipolar Integrated Circuit Analysis and Design Basis, Sep. 30, 1987, p. 253, Publishing House of Electronics Industry.

*Primary Examiner*—Long Nguyen
(74) *Attorney, Agent, or Firm*—Mannava & Kang, P.C.

(57) ABSTRACT

A digital temperature sensing device uses temperature depending characteristic of contact resistance of a MOS transistor and a self-refresh driving device adjusts its self-refresh period depending on temperature using the digital temperature sensing device. The self-refresh driving device includes a first reference voltage generating unit for generating a reference voltage robust to temperature, the first reference voltage generating means being formed with a plurality of MOS transistors, the number of source contacts of the MOS transistors being adjusted such that variation of saturation current through source-drain is compensated for; a second reference voltage generating unit for generating a second reference voltage sensitive to temperature; a level comparator for comparing the first reference voltage with the second reference voltage; and an oscillator for generating a clock signals having differing period depending on the output signal of the level comparator.

3 Claims, 12 Drawing Sheets

U.S. PATENT DOCUMENTS

| | | |
|---|---|---|
| 4,242,693 A | 12/1980 | Biran |
| 4,717,836 A | 1/1988 | Doyle |
| 4,870,467 A | 9/1989 | Boland et al. |
| 5,281,872 A | 1/1994 | Ori |
| 5,512,855 A * | 4/1996 | Kimura .................... 327/538 |
| 5,933,039 A | 8/1999 | Hui et al. |
| 6,140,687 A | 10/2000 | Shimomura et al. |
| 6,337,644 B1 * | 1/2002 | Kasahara .................... 323/315 |
| 6,768,143 B1 | 7/2004 | Fredeman et al. |
| 7,106,127 B2 | 9/2006 | Sim et al. |
| 7,301,186 B2 * | 11/2007 | Choi et al. .................... 257/288 |
| 7,312,509 B2 * | 12/2007 | Han et al. .................... 257/469 |
| 2003/0214858 A1 | 11/2003 | Schnabel et al. |
| 2006/0138582 A1 | 6/2006 | Han et al. |

FOREIGN PATENT DOCUMENTS

| | | |
|---|---|---|
| KR | 2003-0073339 | 9/2003 |

* cited by examiner

FIG. 4A

| Source Contact# Temp.[°C] | 30 | 20 | 10 | 5 | 1 |
|---|---|---|---|---|---|
| -30 | 97.0 | 93.9 | 85.8 | 73.5 | 36.3 |
| -10 | 92.1 | 89.3 | 81.9 | 70.7 | 35.7 |
| 25 | 84.8 | 82.4 | 76.2 | 66.6 | 34.9 |
| 85 | 75.0 | 73.3 | 68.6 | 61.0 | 34.0 |
| 125 | 70.0 | 68.5 | 64.6 | 58.1 | 33.8 |
| Max-Min | 27.0 | 25.3 | 21.2 | 15.4 | 2.5 |

FIG. 4B

| Source Contact# Temp.[°C] | 30 | 20 | 10 | 5 | 1 |
|---|---|---|---|---|---|
| -30 | 38.5 | 37.8 | 35.7 | 32.3 | 19.1 |
| -10 | 38.5 | 37.7 | 35.6 | 32.2 | 19.2 |
| 25 | 38.3 | 37.6 | 35.5 | 32.2 | 19.2 |
| 85 | 38.0 | 37.3 | 35.2 | 31.9 | 19.1 |
| 125 | 37.5 | 36.9 | 34.8 | 31.5 | 18.9 |
| Max-Min | 1.0 | 0.9 | 0.8 | 0.7 | 0.3 |

US 7,592,862 B2

DIGITAL TEMPERATURE SENSING DEVICE USING TEMPERATURE DEPENDING CHARACTERISTIC OF CONTACT RESISTANCE

RELATED APPLICATIONS

This application is a Continuation of U.S. application Ser. No. 11/146,043, filed Jun.7, 2005, now U.S. Pat. No. 7,312,509 claiming priority of Korean Application No. 10-2004-0113575, filed Dec. 28, 2004, the entire contents of each of which are hereby incorporated by reference.

FIELD OF INVENTION

The present invention relates to a semiconductor integrated circuit design; and, more particularly, to a digital temperature sensing device and a self-refresh driving device using the same.

DESCRIPTION OF PRIOR ART

As well known, a MOS transistor shows linear variation for saturation current through source-drain due to mobility characteristic depending on temperature. Accordingly, an integrated circuit (IC), such as a reference voltage source circuit, a delay circuit and so forth, that is designed with such a MOS transistor has characteristic variation due to the prescribed temperature depending characteristic.

Therefore, integrated circuit suppliers test the integrated circuit under extreme condition such as −10° C. and 90° C. to screen the integrated circuit that satisfies all the specification. Accordingly, the failed integrated circuit is to be thrown, which leads producing cost loss.

On the other hand, a DRAM performs self-refresh with a predetermined period to avoid data loss due to cell leakage current, in which the refresh period is fixed without regard to temperature. For example, for typical self-refresh, a scheme for refreshing entire cells in 64 ms with a fixed period of 7.8 µs is used.

However, at higher temperature, it is desirable to have shorter refresh period than at lower temperature than −10° C. or lower temperature than 20° C., because of junction leakage in the DRAM chip. That is, since cell leakage current increases as temperature goes up while cell leakage current decrease as temperature goes down, the refresh period is to be shorter at higher temperature. Presently, in a DRAM with 0.10 µm technology and power voltage 1.8 V, it is desirable to set the refresh period as 7.48 µs at −10° C., 7.8 µs at 25° C., and 8.92 µs at 90° C., 9.48 µs at 125° C.

Consequently, it is required to have stable refresh characteristic of the chip as well as reducing power consumption by adjusting the refresh period differentially depending on temperature.

SUMMARY OF INVENTION

It is, therefore, an object of the present invention to provide a digital temperature sensing device using temperature characteristic of contact resistance of a MOS transistor and a self-refresh driving device for adjusting self-refresh period depending on temperature using the digital temperature sensing device.

In accordance with an aspect of the present invention, there is provided a digital temperature sensing device including a first reference voltage generating unit for generating a reference voltage robust to temperature, the first reference voltage generating means being formed with a plurality of MOS transistors, the number of source contacts of the MOS transistors being adjusted such that variation of saturation current through source-drain is compensated for; a second reference voltage generating unit for generating a second reference voltage sensitive to temperature; and a level comparator for comparing the first reference voltage with the second reference voltage.

In accordance with another aspect of the present invention, there is provided a self-refresh driving device including a first reference voltage generating unit for generating a reference voltage robust to temperature, the first reference voltage generating means being formed with a plurality of MOS transistors, the number of source contacts of the MOS transistors being adjusted such that variation of saturation current through source-drain is compensated for; a second reference voltage generating unit for generating a second reference voltage sensitive to temperature; a level comparator for comparing the first reference voltage with the second reference voltage; and an oscillator for generating a clock signals having differing period depending on the output signal of the level comparator.

BRIEF DESCRIPTION OF THE DRAWINGS

The above and other objects and features of the present invention will become apparent from the following description of preferred embodiments taken in conjunction with the accompanying drawings, in which:

FIGS. 4a and 4b are data tables for simulation results of saturation current of a MOS transistor versus the number of source contacts and temperature;

DETAILED DESCRIPTION OF INVENTION

Hereinafter, a digital temperature sensing device and a self-refresh driving device using the same in accordance with the present invention will be described in detail referring to the accompanying drawings.

Figure 1A:
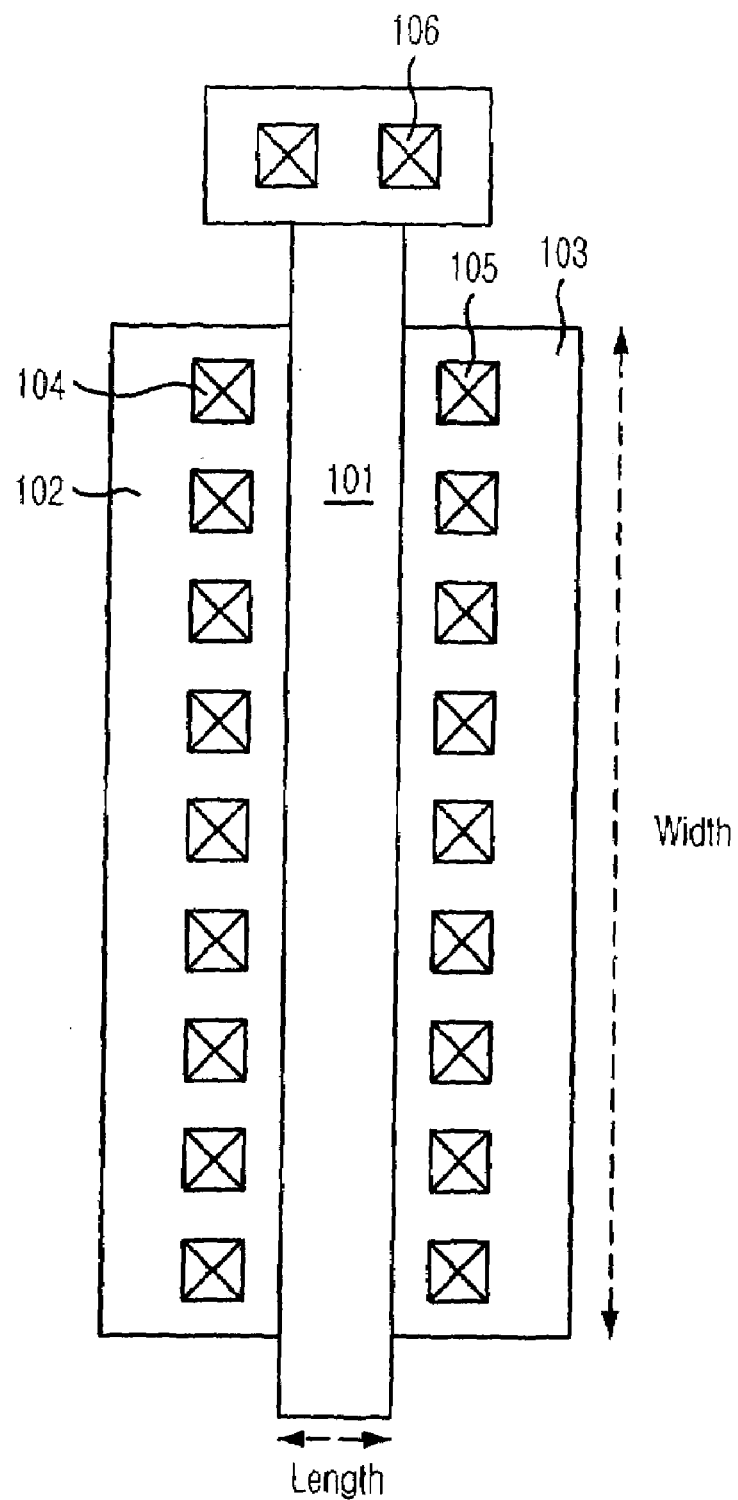
FIGS. 1A and 1B show layout diagrams of a conventional transistor and a transistor in accordance with the present invention, respectively.
Figure 1B:
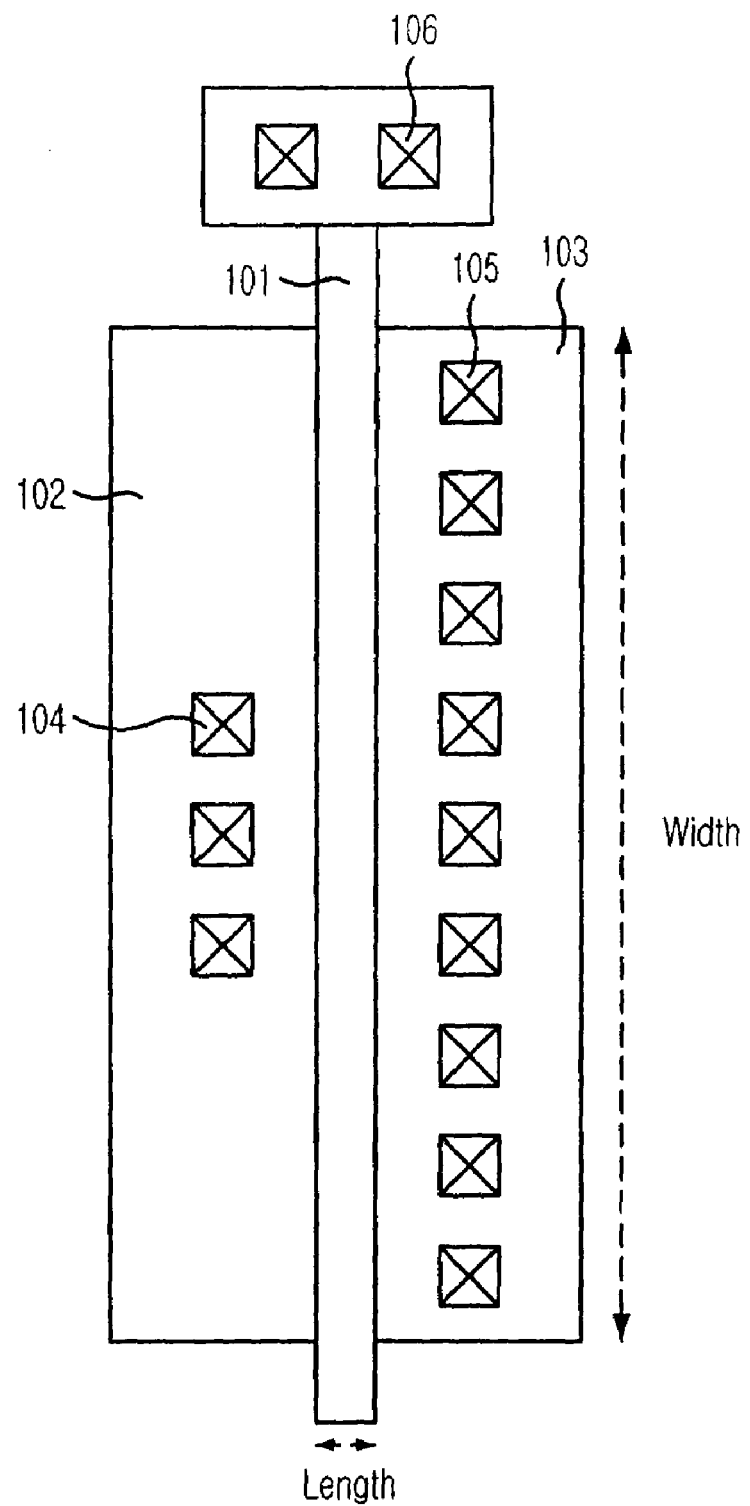

FIGS. 1A and 1B show layout diagrams of a conventional transistor and a transistor in accordance with the present invention, respectively;

Referring to layout diagrams in FIGS. 1A and 1B, each of MOS transistors is constructed with a gate line 101, and a source region 102 and a drain region 103 arranged respectively besides the gate line 101. For the source 102 and the drain 103, contacts 104, 105 are formed for power input and internal connection between elements. Further, another contact 106 is formed at the gate 101.

The size of the transistor depends on width-to-length ratio of the gate.

Referring to 1A and 1B, it can be seen that the number of contacts within the source region 102 of the MOS transistor of the present invention is fewer than the conventional MOS transistor. When the number of the source contacts is reduced as described above, the source contact resistance increases. Accordingly, the MOS transistor characteristic depending on temperature can be compensated for, since it becomes more dependable on temperature as the source contact resistance increases.

In other words, saturation current of the MOS transistor varies depending on temperature and the source contact resistance varies sensitively depending on temperature to counterbalance variation in the saturation current. Current reduction due to increase of the source contact resistance is compensated for, by reducing the length of the gate relatively.

Figure 2A:
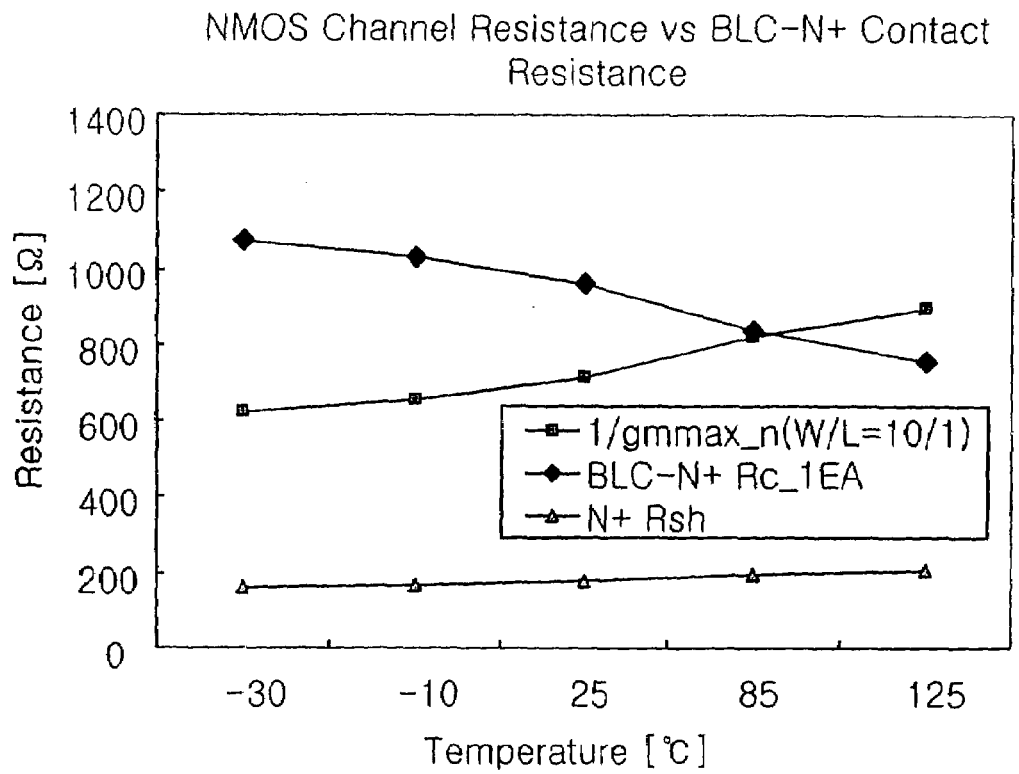
FIGS. 2a and 2b are graphs for simulation results of resistance characteristic for channel resistance, source contact resistance and source impurity region of a MOS transistor versus temperature.

FIG. 2a is a graph for simulation results of temperature depending resistance characteristic of channel resistance, source contact resistance and source impurity of an NMOS transistor having its gate width-to-length ratio of "W/L=10/1". In FIG. 2a, the source contact resistance of the NNOS transistor is indicated as "BLC_N+Rc__1EA". A bit-line is contacted to the source impurity region in a typical DRA14 and its result value is indicated as "BLC_N+Rc__1EA" which represents variation of resistance per source contact. The channel resistance is indicated as "1/gmmax_n(W/L=10/1)" and the resistance of the source impurity region is indicated as "N+Rsh".

Figure 2B:
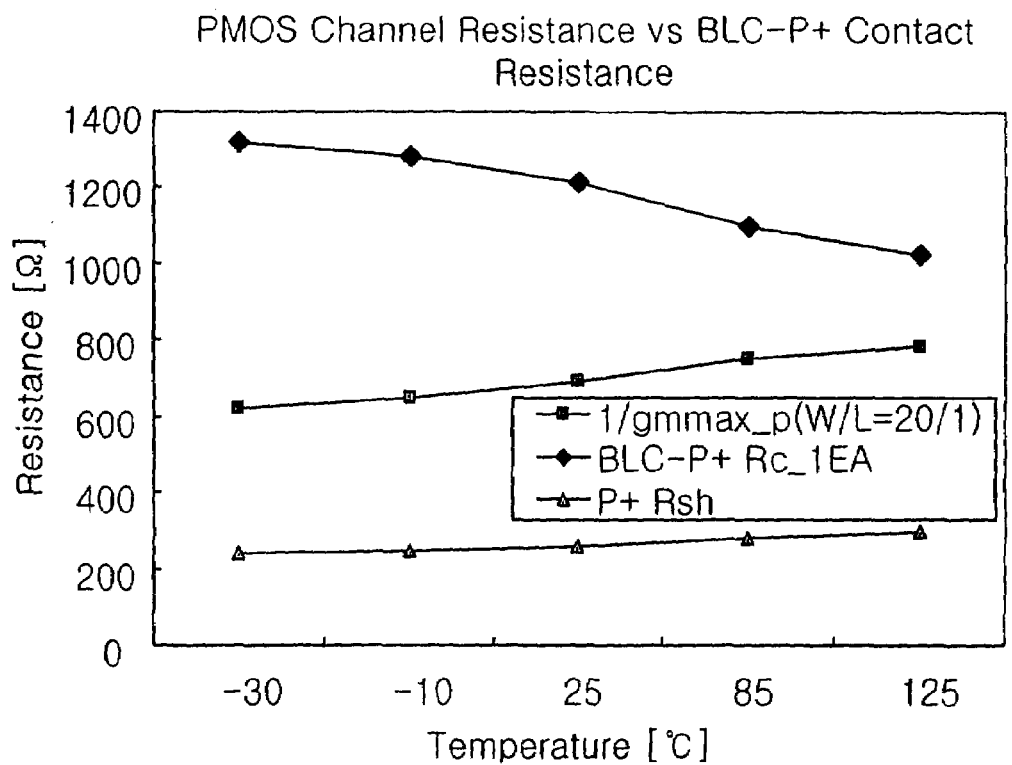

FIG. 2b is a graph for simulation results of temperature depending resistance characteristic of channel resistance, source contact resistance and source impurity region of a PMOS transistor having gate width-to-length ratio of "W/L200/1". In FIG. 2b, the source contact resistance of the PMOS transistor is indicated as "BLC_P+Rc__1EA", the channel resistance is indicated as "1/gmmax_p (W/L=20/1)" and the resistance of the source impurity region is indicated as "P+Rsh".

As seen in FIGS. 2a and 2b, as temperature goes up, the source contact resistance of the NMOS transistor and the PMOS transistor decrease.

Figure 3A:
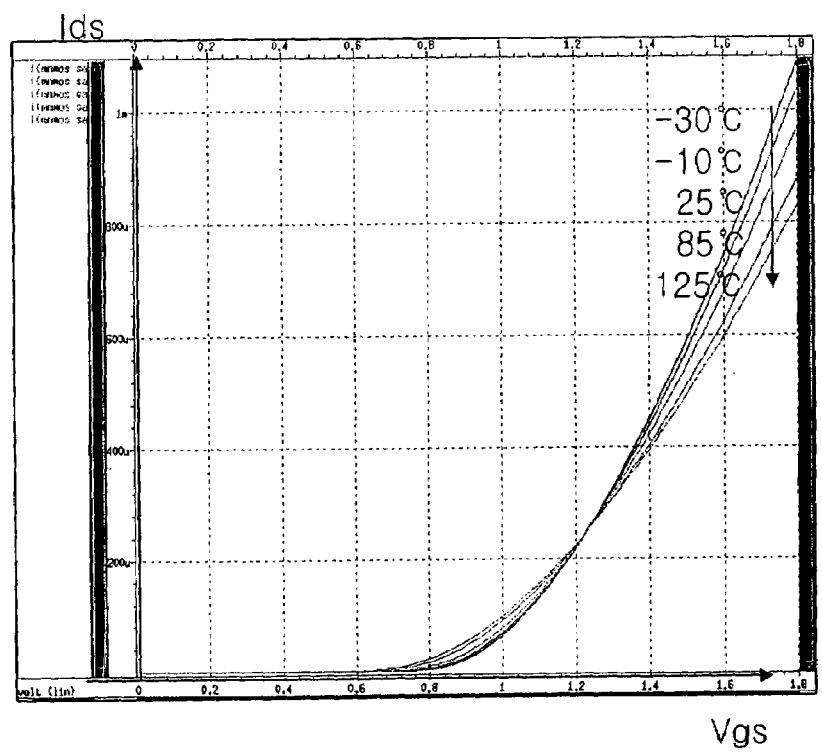
FIGS. 3a and 3b are graphs for simulation results of 15 source-drain current (Id) and gate-source voltage Vgs of a MOS transistor versus temperature.
Figure 3B:
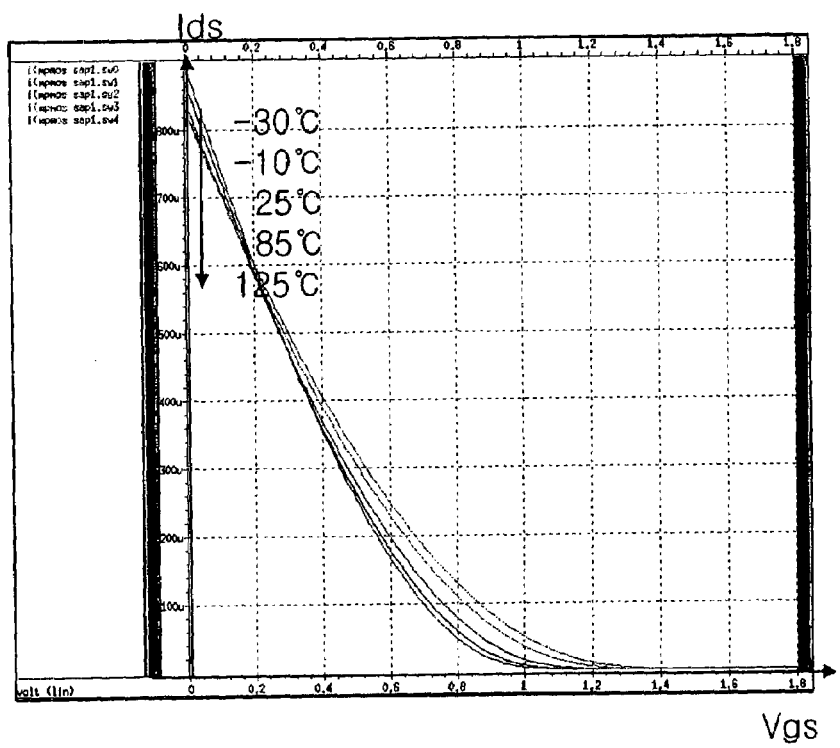

FIG. 3a is a graph for simulation results of source-drain current (Id) and gate-source voltage Vgs of an NMOS transistor versus temperature and FIG. 3b is a graph for simulation results of source-drain current(Id) and gate-source voltage Vgs of a PMOS transistor versus temperature.

As seen in FIGS. 3a and 3b, as temperature goes up, current value decreases at the operational voltage (Vgs=1.6 to 1.8V in the NMOS transistor and Vgs=0 to 0.2V in the PMOS transistor)

Consequently, as seen in FIGS. 2a to 3b, since variation of the saturation current due to temperature and variation of the source contact resistance can be measured, it is possible to counterbalance variation, due to temperature, of saturation current through the source-drain by adjusting the number of source contacts with regard to the measurement.

FIG. 4a is a data table for simulation results of saturation current of a NMOS transistor depending on the number of source contacts and temperature, in which the gate width-to-length ratio of the NMOS transistor is "W/L=10/1".

As seen in the simulation result of FIG. 4a, variation of the saturation current due to difference between maximum temperature and minimum temperature(Max−Min) is 27 μA when the number of source contacts is 30, while variation of the saturation current due to difference between maximum temperature and minimum temperature(Max−Min) is 2.5 μA when the number of source contacts is 1.

FIG. 4b is a data table for simulation results of saturation current of a PMOS transistor depending on the number of source contacts and temperature, in which the gate width-to-length ratio of the PMOS transistor is "W/L=10/1".

As seen in the simulation result of FIG. 4b, variation of the saturation current due to difference between maximum temperature and minimum temperature (Max−Min) is 1.0 μA when the number of source contacts is 30, while variation of the saturation current due to difference between maximum temperature and minimum temperature (Max−Min) is 0.3 μA when the number of source contacts is 1.

Figure 5A:
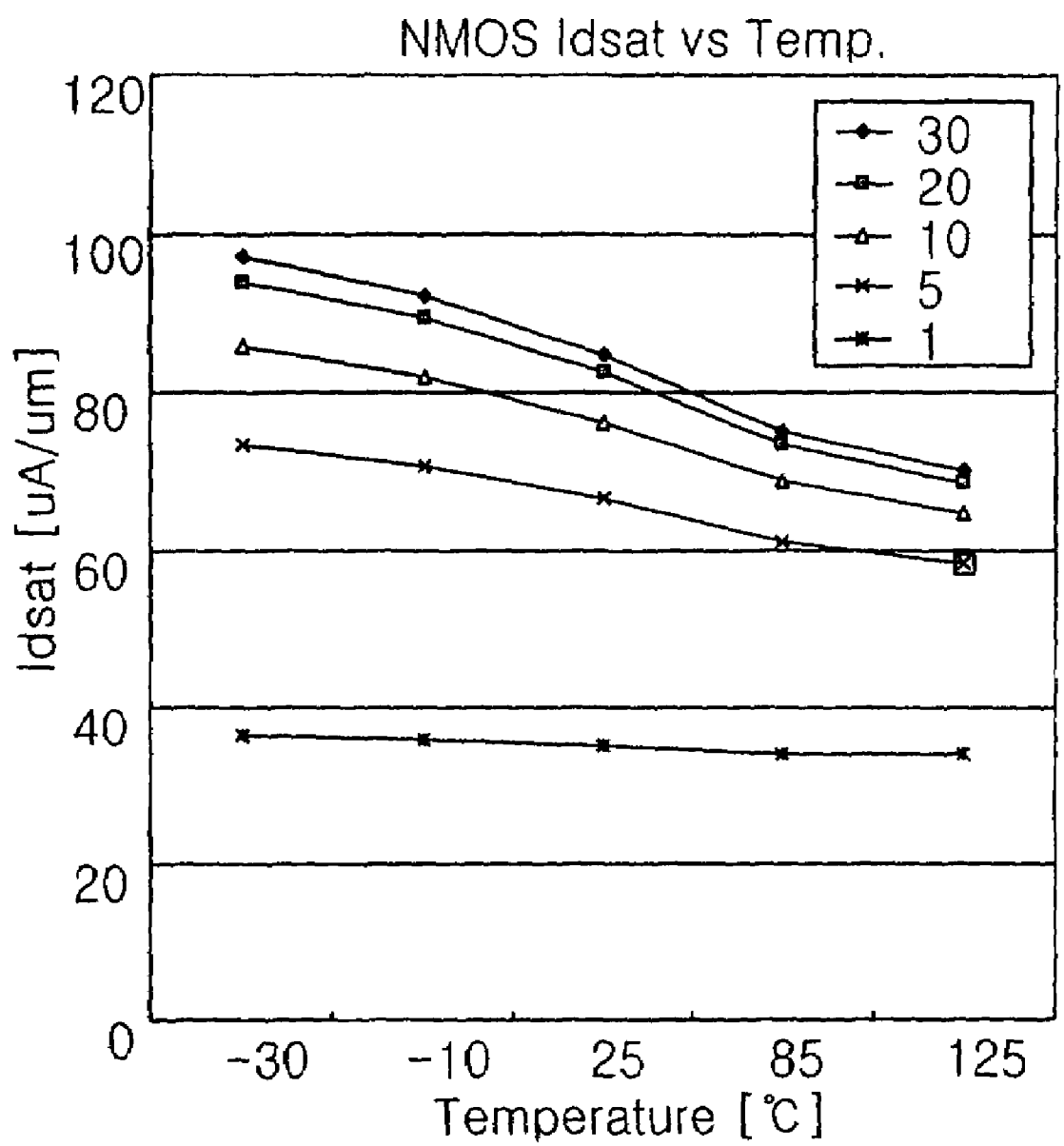
FIGS. 5a and 5b are graphs for data shown in FIGS. 4a and 4b.
Figure 5B:
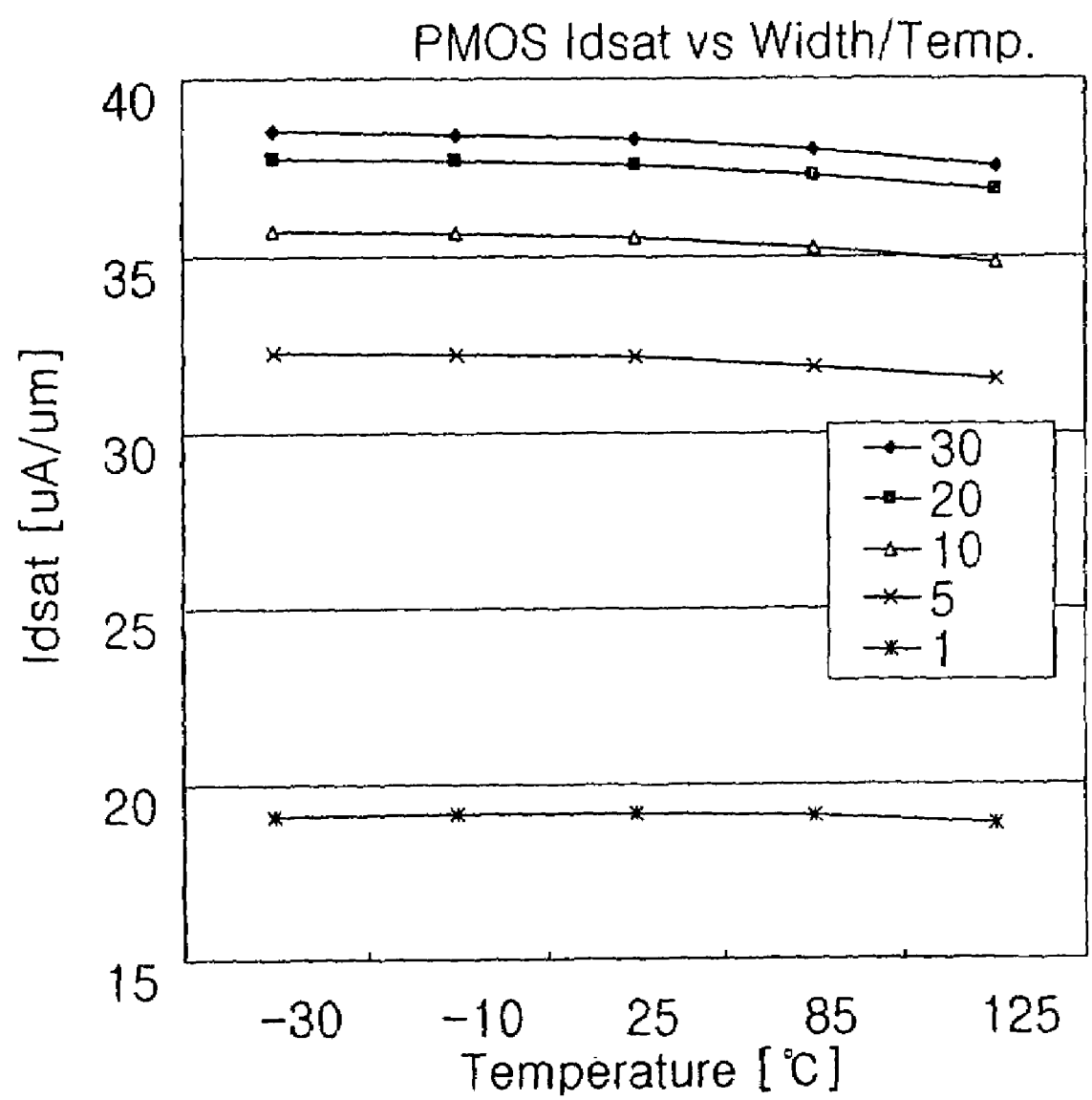

FIGS. 5a and 5b are graphs for data shown in FIGS. 4a and 4b. It can be seen that variation of saturation current idsat due to temperature variation decreases as the number of the source contacts decreases in either NMOS transistor or PMOS transistor.

As described above, by using the temperature depending characteristic of the source contact resistance of the MOS transistor, a reference voltage generating circuit is—implemented to be robust to temperature. Further, by using such a reference voltage generating circuit along with a typical reference generating circuit (sensitive to temperature), a digital temperature sensing device for sensing environmental temperature under which a chip used can be implemented.

Figure 6:
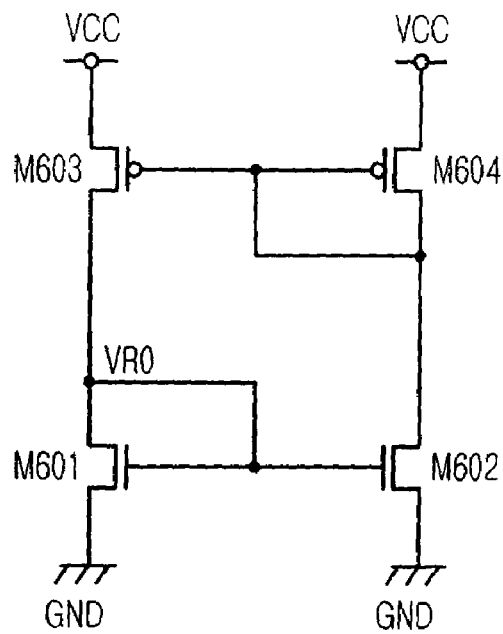
FIG. 6 is a reference voltage generating circuit that is robust to temperature and implemented by using temperature depending characteristic of source contact resistance of a MOS transistor.

FIG. 6 is a reference voltage generating circuit that is robust to temperature and is implemented by using temperature depending characteristic of source contact resistance of a MOS transistor.

Referring to FIG. 6, there is a Widlar reference voltage generating circuit including a plurality of MOS transistors M601, M602, M603, M604 that form a Widlar current mirror circuit. In each MOS transistor, the source contact resistance is adjusted to counterbalance variation of the saturation current through its source-drain due to temperature. That is, each of the MOS transistors M601, M602, M603, M604 has the layout and the source contact resistance of the MOS transistor according to the present invention as previously described (see FIG. 1B).

Particularly, the MOS transistors forming the Widlar current mirror circuit include the first PMOS transistor M604 having a source coupled to a power voltage VCC and commonly coupled gate and drain, the second PMOS transistor M603 having a source coupled to the power voltage VCC and a gate coupled to the gate of the first PMOS transistor M604, the first NMOS transistor M601 having a gate and a drain coupled to the drain of the second PMOS transistor M603 and a source coupled to a ground voltage, and the second NMOS transistor M602 having a drain coupled to the drain of the first PMOS transistor M604, a source coupled to the ground voltage and a gate coupled to the gate of the first NMOS transistor M601. A reference voltage output node VR0 is formed on the contact path between the drain of the first NMOS transistor M601 and the drain of the second MOS transistor M603.

As such, the reference voltage generating circuit in FIG. 6 can generate a stable reference voltage against temperature by adjusting the number of source contacts of the MOS transistors (i.e., to have fewer source contacts) without using a separate temperature compensating resistor.

On the other hand, when a reference voltage generating circuit is formed similarly as in FIG. 6 but with the typical number of source contacts of the MOS transistors as in FIG. 1A (as many as the number of drain contacts and more than the number of source contacts as in FIG. 1B), it generates a reference voltage that is sensitive to temperature.

Figure 7:
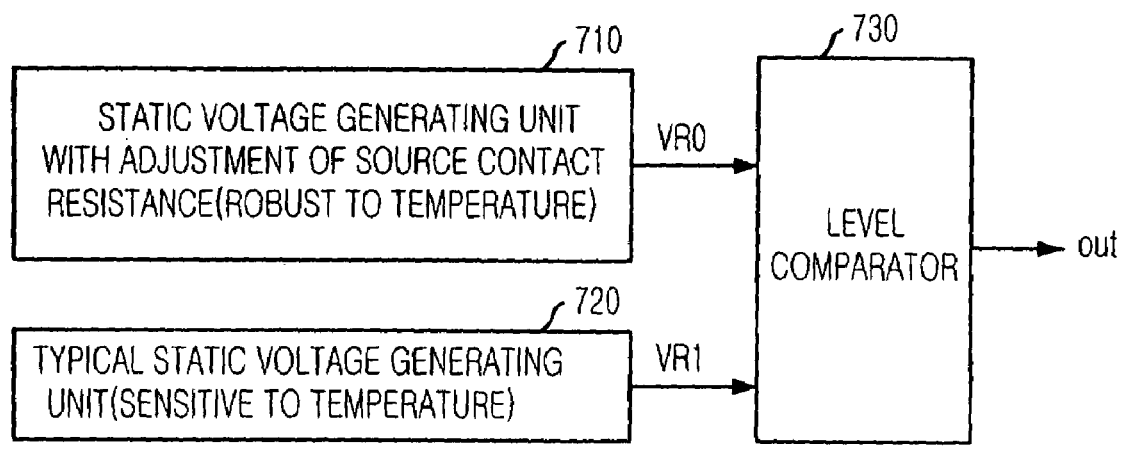
FIG. 7 is a block diagram showing a digital temperature sensing device in accordance with the present invention.

FIG. 7 is a block diagram showing a digital temperature sensing device in accordance with the present invention.

Referring to FIG. 7, the digital temperature sensing device includes a first reference voltage generating unit 710 for generating a first reference voltage robust to temperature, a second reference voltage generating unit 720 for generating a second reference voltage sensitive to temperature, and a level comparator 730 for comparing the first reference voltage with the second reference voltage. The first reference voltage generating unit 710 is formed with a plurality of MOS transistors having adjusted source contacts resistance so that variation of saturation current through the source-drain due to the temperature variation can be counterbalanced.

The first and the second reference voltage generating units 710, 720 have same circuit configuration of the plurality of the MOS transistors for forming the Widlar current mirror circuits. The first reference voltage generating unit 710 is formed with the MOS transistors having fewer source contacts than the MOS transistors of the second reference voltage generating unit 720. That is, the MOS transistors of the second reference voltage generating unit 720 have layout of the typical MOS transistor as in FIG. 1A while the MOS transistors of the first reference voltage generating unit 710 have fewer source contacts as in FIG. 1B to have higher source contact resistance.

On the other hand, since the plurality of transistors forming the first reference voltage generating unit 710 have adjustment of gate width-to-length ratio to compensate for reduction of source-drain current due to higher source contact resistance, they have lower gate width-to-length ratio than the MOS transistors of the second reference voltage generating unit 720.

The number of the source contacts of the MOS transistors in the first reference voltage generating unit 710 is chosen considering variation of the contact resistance due to temperature and variation of the source-drain saturation current due to temperature.

As such, having the number of source contacts of the MOS transistors different between two circuits having similar circuit configuration, the temperature robust reference voltage generating unit 710 and the temperature sensitive reference voltage generating unit 720 can be respectively formed. Further, temperature can be measured by using these reference voltage generating units by comparing the output from one with the output from the other one. Furthermore, a self-refresh driving device can be designed to change the self-refresh period by driving an oscillator depending on the temperature measurement. This will be described in detail with referring to one embodiment as follows.

Fig. B is a circuit diagram of a self-refresh driving device using a 2-bit temperature sensing device, for generating a clock signal that can have one of two periods.

Figure 8:
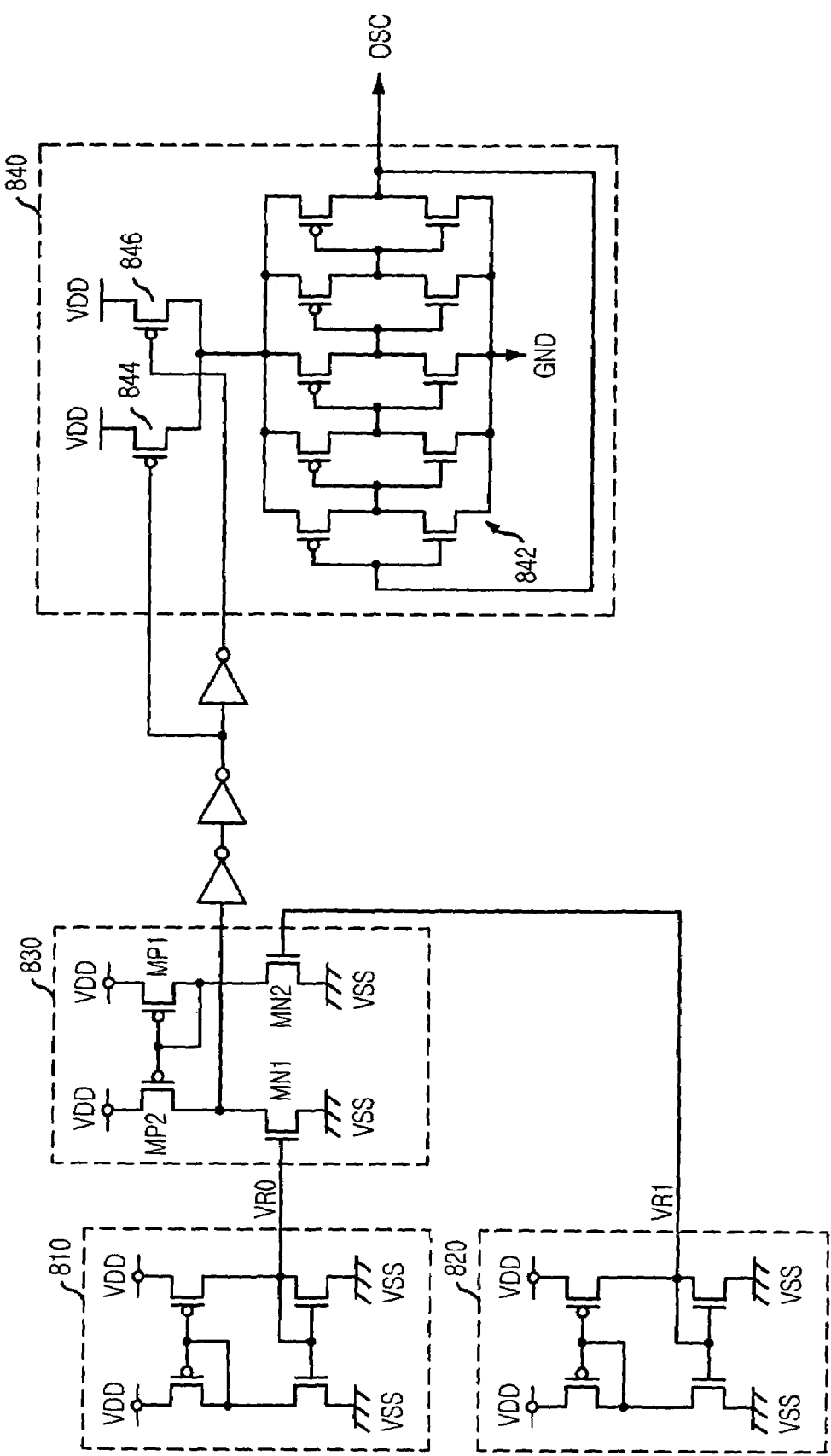
FIG. 8 is a self-refresh driving device in accordance with the first embodiment of the present invention.

Referring to FIG. 8, the self-refresh driving device includes a first reference voltage generating unit 810 for generating the first reference voltage VR0 robust to temperature, a second reference voltage generating unit 820 for generating the second reference voltage VR1 sensitive to temperature, a level comparator 830 for comparing the first reference voltage VR0 with the second reference voltage VR1, and an oscillator 840 for generating a clock signal having one of two periods in response to the output signal from the level comparator 830.

As previously described, the first and the second reference voltage generating units 810, 820 have same circuit configuration in which the plurality of MOS transistors form the Widlar current mirror circuit, but the MOS transistors of the first reference voltage generating unit 810 have fewer source contacts than the MOS transistors of the second reference voltage generating unit 820. That is, the MOS transistors of the second reference voltage generating unit 820 have typical MOS transistor layout as in FIG. 1A while the MOS transistors of the first reference voltage generating unit 810 have relatively fewer source contacts as in FIG. 1B to have higher source contact resistance.

On the other hand, since the gate width-to-length ratio is adjusted in order to compensate for reduction of current through the source-drain due to increase of the source contact resistance of the MOS transistors of the first reference voltage generating unit 810, the MOS transistors of the first reference voltage generating unit 810 have lower gate width-to-length ratio than the MOS transistors of the second reference voltage generating unit 820.

The oscillator 840 includes an inverter chain 842 for outputting a clock signal OSC, and a first PMOS transistor 844 and a second PMOS transistor 846 being different from each other in their size for selectively supplying driving potentials differentially in response to the output signal from the level comparator 830. The first PMOS transistor 844 is smaller than the second PMOS transistor 846.

Figure 9:
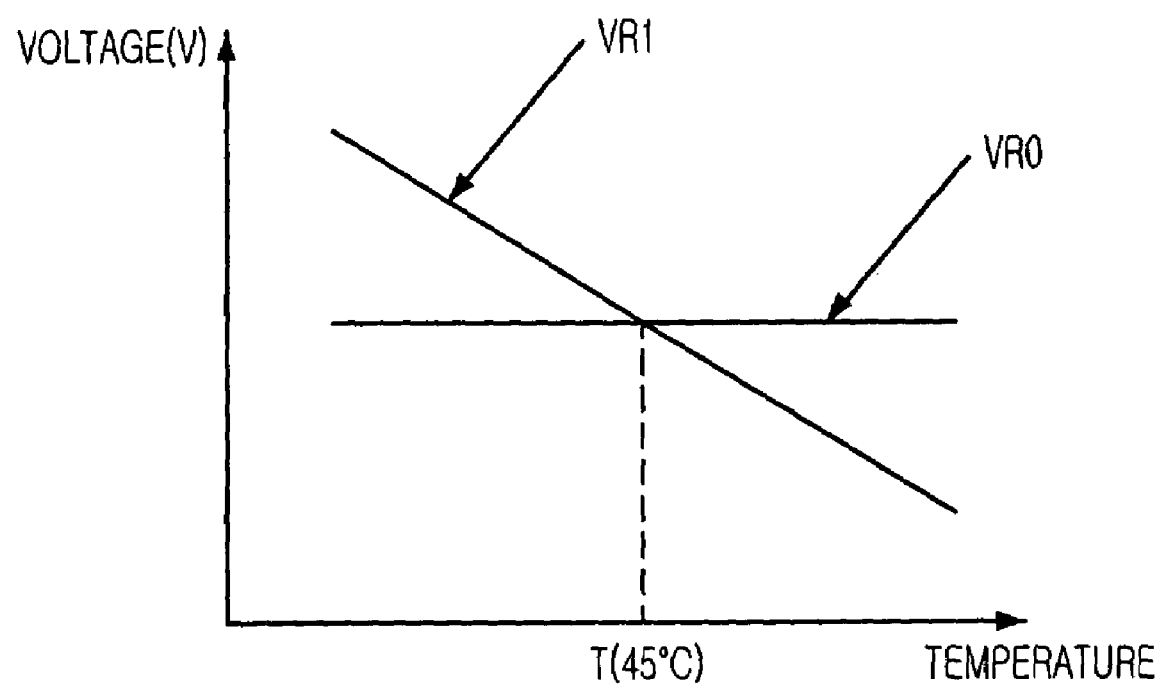
FIG. 9 is a graph of temperature depending characteristic for reference voltages VR0 and VR1.

FIG. 9 is a graph of temperature depending characteristic for reference voltages VR0 and VR1 as shown in FIG. 8. In FIG. 9, the MOS transistors of the reference voltage generating circuit may be designed such that the first reference voltage VR0 and the second reference voltage VR1 meet at 45° C. Since the second reference voltage VR1 is higher than the first reference voltage VR0 when below 45° C., the PMOS transistor 846 of the oscillator 840 is turned on and the PMOS transistor 844 of the oscillator 840 is turned off. Accordingly, since the PMOS transistor 846 of smaller size is turned on, relatively lower potential is used as the driving potential for the inverter chain 842. Consequently, the inverter chain 842 generates the clock signal having a relatively longer period.

On the other hand, since the first reference voltage VR0 is higher than the second reference voltage VR1 over 45° C., the PMOS transistor 844 of the oscillator 840 is turned on and the PMOS transistor 846 of the oscillator 840 is turned off. Accordingly, since the PMOS transistor 844 of larger size is turned on, relatively higher potential is used as the driving potential for the inverter chain 842. Consequently, the inverter chain 842 generates the clock signal having a relatively shorter period. That is, the self-refresh can be performed with relatively shorter period when temperature is high.

Figure 10:
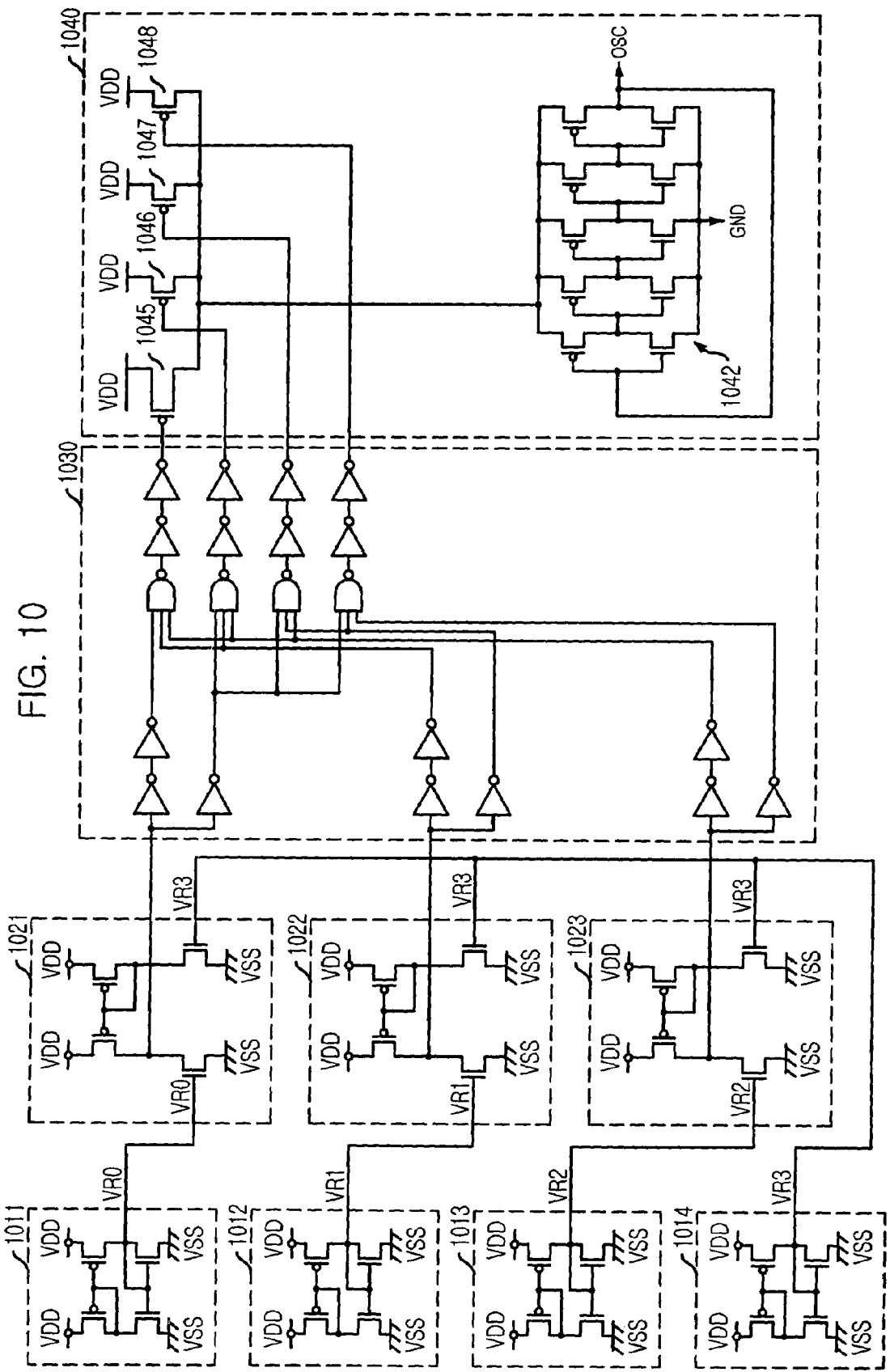
FIG. 10 is a self-refresh driving device in accordance with the second embodiment of the present invention.

FIG. 10 is a self-refresh driving device having one of four periods depending on temperature regions in accordance with the second embodiment. In FIG. 10, by using 3 reference voltage generating circuits robust to temperature and one reference voltage generating circuit sensitive to temperature, the levels of the 3 reference voltages robust to temperature are respectively compared to the level of the reference voltage sensitive to temperature. Then, the level comparison results are decoded in order to generate signals that are activated depending on temperature region. With this signal, the clock signal is generated to have one of four periods. That is, the clock signal can be generated to have one of 4 periods.

Particularly, referring to FIG. 10, the self-refresh driving device includes a first reference voltage generating unit 1010 for generating the first reference voltage VR0 robust to temperature, a second reference voltage generating unit 1012 for generating the second reference voltage VR1 robust to temperature, a third reference voltage generating unit 1013 for generating the third reference voltage VR2 robust to temperature, a fourth reference voltage generating unit 1014 for generating the fourth reference voltage VR3 sensitive to temperature, a first level comparator 1021 for comparing the level of the first reference voltage VR0 to the level of the fourth reference voltage VR3, a second level comparator 1022 for comparing the level of the second reference voltage VR1 to the level of the third reference voltage VR2, and a third level comparator 1023 for comparing the level of the third reference voltage VR2 to the level of the fourth reference voltage VR3.

However, the outputs of the first to the third level comparators are decoded through a decoder 1030 to control the oscillator 1040.

The oscillator 1040 includes an inverter chain 1042 for outputting a clock signal OSC, and a first to a fourth PMOS transistors 1045, 1046, 1047, 1048 different from each other in their size for supplying driving potentials to the inverter chain 1042 differentially in response to the output signal of the decoder 1030. Here, the first PMOS transistor 1045 is the smallest one and the fourth PMOS transistor 1048 is the largest one. The second PMOS transistor 1046 is the second smallest one and the third PMOS transistor 1047 is the third smallest one.

Figure 11:
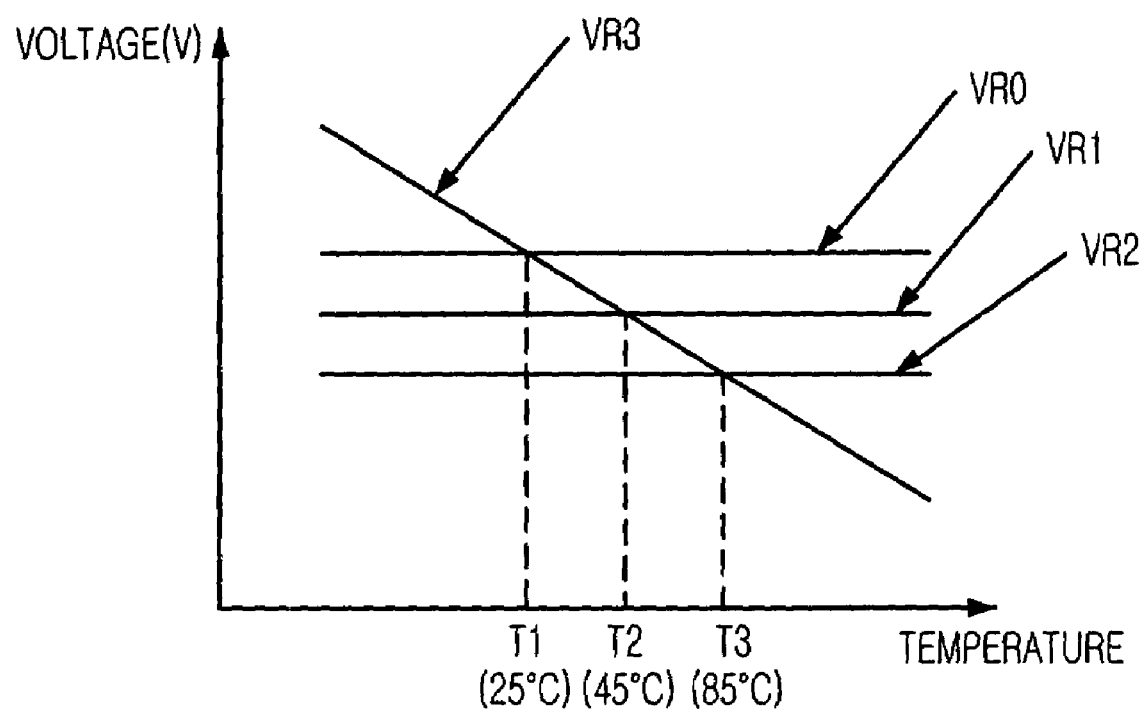
FIG. 11 is a graph of temperature depending characteristic for reference voltages VR10, VR11, VR12, VR13 shown in FIG. 10.

FIG. 11 is a graph of temperature depending characteristic for the reference voltages VR0, VR1, VR2, VR3 shown in FIG. 10. In FIG. 11, the levels of reference voltages robust to temperature VR0, VR1, VR2 have relation of VR0>VR1>VR2. Accordingly, when temperature is lower than T1 (e.g., 25° C.), all the reference voltages VR0, VR1, VR2 are lower than the reference voltage VR3 so as to have the level comparators and a decoder turn on the PMOS transistor 1045 while turning off the remaining PMOS transistors 1046, 1047, 1048 and, as a result, the inverter chain is driven with lowest potential. As such, the clock signal has the longest period. For the other temperature regions, the operation is similar to described above and their detail description will be omitted.

Consequently, the self-refresh driving device of the present invention can perform self-refresh operation with various periods depending on four temperature regions. Particularly, at higher temperature, it has shorter self-refresh period.

While the present invention has been described with respect to the particular embodiments, it will be apparent to those skilled in the art that various changes and modifications may be made without departing from the spirit and scope of the invention as defined in the following claims.

What is claimed is:

1. A reference voltage generator, comprising:
   a first PMOS transistor having a source coupled to a power voltage and commonly coupled gate and drain;
   a second PMOS transistor having a source coupled to the power voltage and a gate coupled to the gate of the first PMOS transistor;
   a first NMOS transistor having a gate and a drain coupled to the drain of the second PMOS transistor and a source coupled to a ground voltage; and
   a second NMOS transistor having a drain coupled to the drain of the first PMOS transistor, a source coupled to the ground voltage and a gate coupled to the gate of the first NMOS transistor,
   wherein an output node is formed on a contact path between the drain of the first NMOS transistor and the drain of the second PMOS transistor and each of the MOS transistors has the adjusted number of source contacts to compensate for variation of a saturation current flowing through its source and drains,
   the number of the source contacts is adjusted to increase source contact resistance, and
   the number of the source contacts is fewer than the number of drain contacts.

2. The reference voltage generator as recited in claim 1, wherein gate width-to-length ratio of each of the MOS transistors is adjusted to compensate for reduction of a desired current flowing through its source and drain due to the increase of the source contact resistance.

3. The reference voltage generator as recited in claim 1, wherein the number of the source contacts is determined depending on a variation amount of the source contact resistance and a variation amount of the saturation current due to a temperature variation.

* * * * *